United States Patent
Okumura et al.

(10) Patent No.: US 8,830,534 B2
(45) Date of Patent: Sep. 9, 2014

(54) IMAGE PROCESSING APPARATUS, METHOD AND COMPUTER PROGRAM PRODUCT CAPABLE OF SCANNING DOCUMENTS AND PARALLEL TO PROCESSING ON THE SCANNED DOCUMENTS

(75) Inventors: Yuichi Okumura, Ishikawa (JP); Kiyoto Kosaka, Ishikawa (JP)

(73) Assignee: PFU Limited, Ishikawa (JP)

( * ) Notice: Subject to any disclaimer, the term of this patent is extended or adjusted under 35 U.S.C. 154(b) by 179 days.

(21) Appl. No.: 13/432,891

(22) Filed: Mar. 28, 2012

(65) Prior Publication Data

US 2012/0300264 A1 Nov. 29, 2012

(30) Foreign Application Priority Data

May 27, 2011 (JP) ................. 2011-119306

(51) Int. Cl.
*H04N 1/40* (2006.01)
*H04N 1/00* (2006.01)
*H04N 1/32* (2006.01)
*G06K 9/46* (2006.01)
*G03G 15/22* (2006.01)

(52) U.S. Cl.
CPC ....... *H04N 1/32523* (2013.01); *H04N 1/00824* (2013.01); *H04N 1/00811* (2013.01); *H04N 2201/0081* (2013.01); *H04N 1/00453* (2013.01); *H04N 1/00461* (2013.01); *H04N 1/0096* (2013.01)

USPC ........... 358/448; 358/1.9; 358/474; 382/193; 382/304; 399/151

(58) Field of Classification Search
None
See application file for complete search history.

(56) References Cited

U.S. PATENT DOCUMENTS

| 5,283,667 | A | * | 2/1994 | Kojima et al. | ............... 358/462 |
| 7,603,536 | B2 | * | 10/2009 | Yokochi et al. | ............... 711/169 |
| 2004/0095612 | A1 | | 5/2004 | Eguchi et al. | |
| 2005/0168763 | A1 | * | 8/2005 | Higuchi et al. | ............... 358/1.13 |
| 2009/0175504 | A1 | | 7/2009 | Koarai | |

FOREIGN PATENT DOCUMENTS

| CN | 1501686 A | 6/2004 |
| JP | 2005-251165 | 9/2005 |
| JP | 2006-209543 | 8/2006 |
| JP | 2008-283494 | 11/2008 |

* cited by examiner

*Primary Examiner* — Steven Kau
(74) *Attorney, Agent, or Firm* — McDermott Will & Emery LLP (57) ABSTRACT

An image processing apparatus, includes an image-scanning unit, and an image processing unit, wherein when the image-scanning unit continuously scans a plurality of documents, the image-scanning unit continuously scans the documents and parallel the image processing unit executes image processing on the scanned documents.

6 Claims, 7 Drawing Sheets

IMAGE PROCESSING APPARATUS, METHOD AND COMPUTER PROGRAM PRODUCT CAPABLE OF SCANNING DOCUMENTS AND PARALLEL TO PROCESSING ON THE SCANNED DOCUMENTS

CROSS-REFERENCE TO RELATED APPLICATION

This application is based upon and claims the benefit of priority from Japanese Patent Application No. 2011-119306, filed May 27, 2011, the entire contents of which are incorporated herein by reference.

BACKGROUND OF THE INVENTION

1. Field of the Invention

The present invention relates to an image processing apparatus, an image processing method, and a computer program product.

2. Description of the Related Art

Some conventional image processing apparatuses separately store therein images acquired from image-scanning apparatuses and correct the stored images.

For example, JP-A-2008-283494 discloses an image processing system and a technique in which meta-data of an image determined as an abnormal image by image determination is stored and an image needed to be corrected is displayed based on the meta-data.

JP-A-2005-251165 discloses an image processing apparatus and a technique in which the image processing apparatus stores therein images before being edited, editing parameters, and edited images and, when an image edited based on the editing parameters is displayed, compares the editing parameters with the parameters in the stored image, and displays the stored edited image when the parameters are equal to each other, or displays the stored image before being edited when the parameters are different from each other.

JP-A-2006-209543 discloses an image editing apparatus and a technique in which the image editing apparatus records an original image and processing history thereof so as to efficiently correct the image.

The conventional image processing apparatuses (e.g., disclosed in the above-described Japanese Patent Application Publications), however, have problems in that they do not correct images while efficiently operating image-scanning apparatuses thereof because scanning of new images can be initiated only after image processing or image correction currently underway is complete. As a result, the conventional image processing apparatuses do not fully exhibit their performance even if the image-scanning units thereof have excellent performance.

SUMMARY OF THE INVENTION

It is an object of the present invention to at least partially solve the problems in the conventional technology.

An image processing apparatus according to one aspect of the present invention includes an image-scanning unit, and an image processing unit, wherein when the image-scanning unit continuously scans a plurality of documents, the image-scanning unit continuously scans the documents and parallel the image processing unit executes image processing on the scanned documents.

An image processing method according to another aspect of the present invention is executed by an image processing apparatus, including an image-scanning unit, and an image processing unit, and the method is executed by the image processing unit, including a image processing step of executing image processing on scanned documents parallel with continuous document-scanning by the image-scanning unit when the image-scanning unit continuously scans a plurality of the documents.

A computer program product having a non-transitory computer readable medium according to still another aspect of the present invention includes programmed instructions for an image processing method executed by an image processing apparatus, including an image-scanning unit, and an image processing unit, wherein the instructions, when executed by the image processing unit, cause the image processing unit to execute a image processing step of executing image processing on scanned documents parallel with continuous document-scanning by the image-scanning unit when the image-scanning unit continuously scans a plurality of the documents.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Embodiments of an image processing apparatus, an image processing method, and a computer program product according to the present invention will be explained in detail below based on the drawings. The embodiment does not limit the invention.

Outline of the Embodiment of the Present Invention

Figure 1:
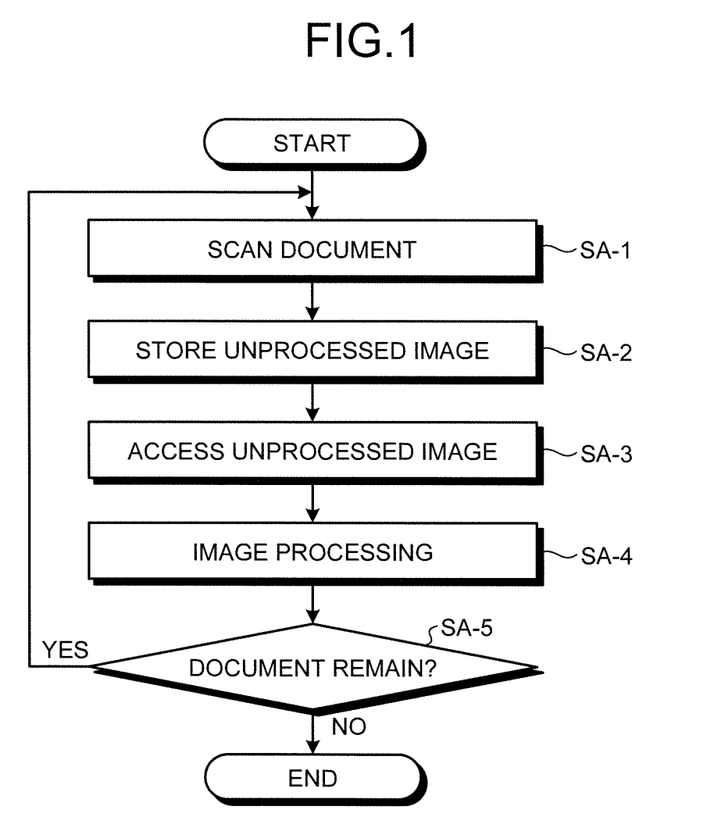
FIG. 1 is a flowchart of a basic principle of an embodiment.

The outline of an embodiment of the present invention is explained below with reference to FIG. 1, and thereafter, configurations, processing, and the like of the embodiment are explained in detail. FIG. 1 is a flowchart of a basic principle of the embodiment.

The embodiment has following basic features in general. That is, as shown in FIG. 1, a control unit of an image processing apparatus of an embodiment requests an image-scanning unit to continuously scan images of a plurality of documents set thereon by a user and acquires the images of the scanned documents (step SA-1).

The control unit of the image processing apparatus stores the unprocessed images, which are the images of the documents scanned by the image-scanning unit, into a storage unit (step SA-2).

The control unit of the image processing apparatus accesses the unprocessed images stored in the storage unit and acquires the unprocessed images (step SA-3).

The control unit of the image processing apparatus executes image processing on the acquired unprocessed images (step SA-4).

The control unit of the image processing apparatus determines whether the documents remain in the image-scanning unit (step SA-5).

When determining that the documents remain in the image-scanning unit (YES at step SA-5), the control unit of the image processing apparatus proceeds to step SA-1. When determining that no documents remain in the image-scanning unit (NO at step SA-5), the control unit of the image processing apparatus ends the processing after the processing at step SA-4 is complete. The control unit starts processing at step SA-5 after the completion of processing at step SA-2 and before the completion of processing at step SA-3 and step SA-4. That is, the control unit parallel executes the processing at step SA-1, SA-2, and SA-5 and the processing at step SA-3 and SA-4.

Configuration of an Image Processing Apparatus 100

The configuration of the image processing apparatus 100 is explained below with reference to FIG. 2 and FIG. 3.

Figure 2:
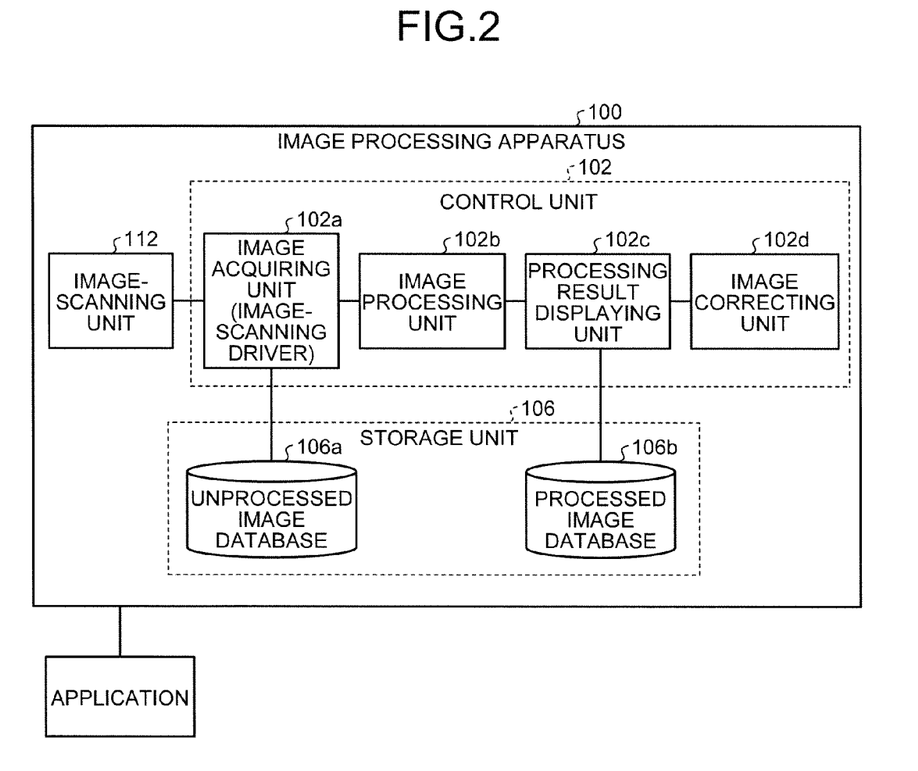
FIG. 2 is a block diagram of an example of a configuration of an image processing apparatus to which the embodiment is applied.

FIG. 2 is a block diagram of an example of a configuration of the image processing apparatus 100 to which the embodiment is applied. Only components related to the embodiment are schematically shown in the figure from among components in the configuration.

In FIG. 2, the image processing apparatus 100 generally includes a control unit 102, a storage unit 106, an image-scanning unit 112, a display unit 114 (not shown), and an input unit 116 (not shown). The control unit 102 is a Central Processing Unit (CPU) or the like that performs overall control on the whole image processing apparatus 100. The storage unit 106 is a device for storing various databases, tables, or the like. Each unit of the image processing apparatus 100 is communicably connected to one another via any communication channels. The image-scanning unit 112, the display unit 114, and the input unit 116 may connect to the control unit 102 and the like via an input-output control interface unit (not shown). Furthermore, the image processing apparatus 100 may be communicably connected to a network via a communication device, such as a router, and a wired communication line or a wireless communication means such as a dedicated line.

The storage unit 106 is a storage unit that is a fixed disk device such as Hard Disk Drive (HDD), Solid State Drive (SSD) and the like, and stores various databases and tables (a unprocessed image database 106a and a processed image database 106b). For example, the storage unit 106 stores therein various programs, tables, files, databases, web pages, and the like used in various processing.

Among the components included in the storage unit 106, the unprocessed image database 106a is an unprocessed image storage unit that stores unprocessed images that are images of the documents scanned by the image-scanning unit 112. The unprocessed image database 106a may add on each of the unprocessed images unprocessed image identification information serving as unique identification information of the unprocessed image and stores the unprocessed images with the unprocessed image identification information. The unprocessed image database 106a may store thumbnails of the unprocessed images. The unprocessed image database 106a may store the images of the documents scanned by a plurality of image-scanning units 112 as a compiled result.

The processed image database 106b is a processed image storage unit that stores processed images, which are the images after the control unit 102 executes image processing on the documents scanned by the image-scanning unit 112. The processed image database 106b may add on each of the processed images processed image identification information serving as the unique identification information of the processed image and stores the processed images with the processed image identification information. The processed image database 106b may store the thumbnails of the processed images.

In FIG. 2, a scanner, a digital camera, a web camera, or the like can be used as the image-scanning unit 112. A display unit displaying images (such as a display or a monitor constituted of a liquid crystal or organic EL) can be used as the display unit 114. A key input unit, a touch panel, a keyboard, or a microphone, or the like can be used as the input unit 116.

In FIG. 2, the control unit 102 includes an internal memory for storing a control program such as an Operating System (OS), programs that define various processing procedures (such as an application program), and necessary data. The control unit 102 performs information processing for executing various processing by these programs or the like. For example, as shown in FIG. 2, the control unit 102 may transmit a processed image to any application software and store the processed image corrected by the application software (e.g., mail application software) into the processed image database 106b. The application software may be installed in the image processing apparatus 100 or installed in an external apparatus coupled to the image processing apparatus 100 though a network. The control unit 102 functionally and conceptually includes an image acquiring unit 102a, an image processing unit 102b, a processing result displaying unit 102c, and an image correcting unit 102d.

The image acquiring unit 102a is an image-scanning driver serving as an image acquiring unit that acquires the images of the documents scanned by the image-scanning unit 112. The image acquiring unit 102a may request the image-scanning unit 112 to scan images (e.g., high resolution color images) when documents are set on the image-scanning unit 112, for example. The image acquiring unit 102a may store the unprocessed images, which are the images of the documents scanned by the image-scanning unit 112, into the unprocessed image database 106a. The image acquiring unit 102a may produce the thumbnails of the unprocessed images and store the thumbnails into the unprocessed image database 106a. The image acquiring unit 102a may produce an ID of an unprocessed image (e.g., an identifier (ID) of the image-scanning unit 112 that scans the unprocessed image or a number representing the order when the image-scanning unit 112 scans the unprocessed image, which is included in tag information of the unprocessed image) and store the ID into the unprocessed image database 106a. The image acquiring unit 102a may transmit a notification that the image of the document scanned by the image-scanning unit 112 is acquired to the image processing unit 102b. That is, the image acquiring unit 102a may notify the image processing unit 102b of the acquisition of the image of the document scanned by the image-scanning unit 112. The image acquiring unit 102a may request the image-scanning unit 112 to scan the images until no documents to be scanned remain and continue to notify the image processing unit 102b of the acquisition of a new image without waiting for the image to be processed by the image processing unit 102b.

The image processing unit 102b is an image processing unit that executes image processing on the document scanned by the image-scanning unit 112. The image processing unit 102b may parallel (e.g., simultaneously) execute image processing on the image of the document scanned by the image-scanning unit 112 and continuous scanning of the documents executed by the image-scanning unit 112. The image processing unit 102b may receive a notification (e.g., a scan notification) of the acquisition of the image from the image acquiring unit 102a. The image processing unit 102b may acquire (scan) the image based on the notification transmitted by the image acquiring unit 102a (image-scanning driver) from the unprocessed image database 106a and execute image processing on the acquired image. The image processing unit 102b may receive the notification from the image acquiring unit 102a and execute image processing until no notification is received from the image acquiring unit 102a. When the image processing is complete, the image processing unit 102b may store the processed image (image processing result) into the processed image database 106b and transmit (notify) the thumbnail and a determination result (image processing result) of the processed image to the processing result displaying unit 102c. The image processing unit 102b determines a clipping position based on the image of the document scanned by the image-scanning unit 112 and clips a part from the image in automatic document size detection processing, for example. If it is determined that the document size is out of determination, the image processing unit 102b may transmit (notify) an error notification and the unprocessed image to the processing result displaying unit 102c. When determining that the document size determination may be incorrect in the automatic document size detection processing, the image processing unit 102b transmits (notifies) the processed image (clipped result) and a clipping determination result (notification that the processed image may be incorrect) to the processing result displaying unit 102c. The image processing may be gamma correction, automatic document detection, blank sheet determination, automatic monochrome/color/gray document determination, correction of document direction or slope, processing of image compression, conversion of color image to gray image, and image binarization.

The processing result displaying unit 102c is a processing result displaying unit that displays the processed image. The processing result displaying unit 102c may display any one or both of the unprocessed images and the processed images as a list. The processing result displaying unit 102c may be capable of selecting, based on any one or both of unprocessed image identification information and processed image identification information, the image corresponding to any one or both of the unprocessed image identification information and the processed image identification information. The processing result displaying unit 102c may be capable of selecting an image based on a similarity between the unprocessed image and the processed image. The processing result displaying unit 102c may display on the display unit 114 any one or both of the unprocessed image and the processed image. For example, in the automatic document size detection processing executed by the image processing unit 102b, if the document size determination is successful, the processing result displaying unit 102c may display the thumbnail and the determination result of the processed image transmitted from the image processing unit 102b on the display unit 114 and store the processed image into the processed image database 106b. That is, the processing result displaying unit 102c may produce a thumbnail of the processed image and store the thumbnail into the processed image database 106b. The processing result displaying unit 102c may produce an ID of the processed image (e.g., the identifier (ID) of the image-scanning unit 112 that scans the image or a number representing the order when the image-scanning unit 112 scans the image, which is included in the tag information of the processed image) and store the ID into the processed image database 106b. In this case, when images are requested to be scanned as portable document format (PDF) files, for example, as a scanning setting, the processing result displaying unit 102c may store a plurality of files (processed images) into the processed image database 106b as a single PDF file. When a user does not satisfy the result, the processing result displaying unit 102c may transmit (notify) the unprocessed image to the image correcting unit 102d based on a correction instruction instructed by the user through the input unit 116. When the unprocessed image is corrected by the image correcting unit 102d, the processing result displaying unit 102c may display on the display unit 114 the corrected image and the thumbnail.

The image correcting unit 102d is an image correcting unit that corrects the unprocessed image. The image correcting unit 102d may display any one or both of the unprocessed images and the processed images as a list. The image correcting unit 102d may be capable of selecting, based on any one or both of the unprocessed image identification information and the processed image identification information, the image corresponding to any one or both of the unprocessed image identification information and the processed image identification information. The image correcting unit 102d may be capable of selecting an image based on a similarity between the unprocessed image and the processed image. The image correcting unit 102d may display on the display unit 114 the unprocessed image acquired from the unprocessed image database 106a so as to allow a user to execute the image correction processing (image processing). When the correction processing is complete, the image correcting unit 102d may transmit the unprocessed image after correction to the processing result displaying unit 102c and allow the processing result displaying unit 102c to update data stored in the processed image database 106b (e.g., to store any one or both of the unprocessed image after correction and the thumbnail of the unprocessed image after correction). When a user makes a mistake in a (initial) scanning setting, all of the images may be far from the user's expectation. In such a case, the image correcting unit 102d may correct all of the images at once based on the correction instruction instructed by the user through the input unit 116, transmit the unprocessed images after correction to the processing result displaying unit 102c, and allow the processing result displaying unit 102c to store any one or both of the unprocessed image after correction and the thumbnail of the unprocessed image after correction into the processed image database 106b. The correction processing may be image processing executed by changing the parameters used for image processing executed by the image processing unit 102b. An image before executing image processing may be stored because the image is subjected to image processing again in the correction processing.

Generally, high accuracy image processing takes long processing time. Because of this, in case that high accuracy image processing is allocated to the image processing unit 102b that consistently operates and is executed by the image processing unit 102b, it takes certain time to display the processing result even if the image processing unit 102b is independently operated. In the embodiment, the high accuracy image processing is allocated to the image correcting unit 102d so as to be executed. This structure enables time taken to display the processing result to be reduced. For example, to reduce the time taken to display the processing result, the image processing unit 102b may execute automatic size detection capable of detecting only a single document while the image correcting unit 102d may execute automatic size detection capable of detecting a plurality of documents (a multi-cropping function) and the high accuracy image processing such as a function to automatically correct distortion of a document. In addition, the image correcting unit 102d allows the processing result displaying unit 102c to display only an image that the image processing unit 102b fails to detect, and automatically executes multi-cropping, distortion correction, and the like on the image. In this way, the multi-cropping, the distortion correction, and the like can be executed on only images need to be processed. As a result, images satisfying user's expectation can be efficiently produced.

Figure 3:
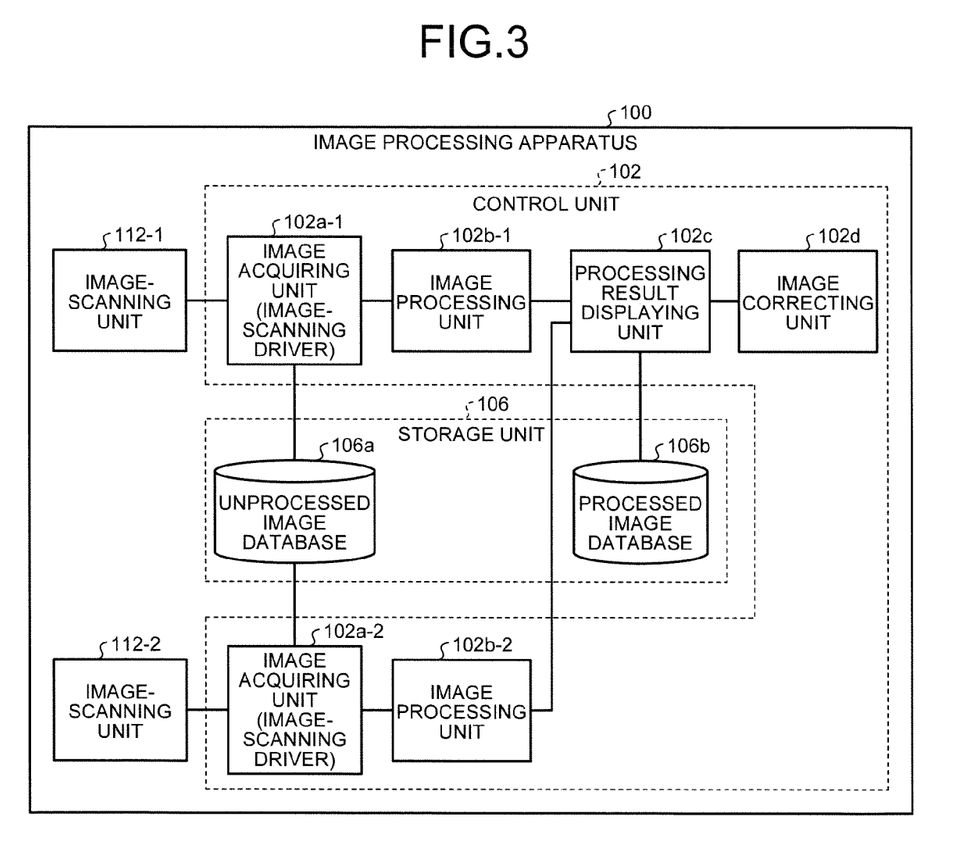
FIG. 3 is a block diagram of an example of a configuration of an image processing apparatus to which the embodiment is applied.

FIG. 3 is a block diagram of an example of a configuration of the image processing apparatus 100 to which the embodiment is applied. Only components related to the embodiment are schematically shown in the figure from among components in the configuration.

In FIG. 3, the image processing apparatus 100 generally includes a control unit 102, a storage unit 106, more than one image-scanning unit 112 (an image-scanning unit 112-1 and an image-scanning unit 112-2), a display unit 114 (not shown), and an input unit 116 (not shown).

The structures of the control unit 102, the storage unit 106, the image-scanning unit 112, and the display unit 114 shown in FIG. 3 are the same as those of the control unit 102, the storage unit 106, the image-scanning unit 112, and the display unit 114 shown in FIG. 2 except for the fact that a plurality of image-scanning units 112 are included. The explanation of the structures is thus omitted.

In FIG. 3, the control unit 102 functionally and conceptually includes the image acquiring unit 102a (an image acquiring unit 102a-1 and an image acquiring unit 102a-2), the image processing unit 102b (an image processing unit 102b-1 and an image processing unit 102b-2), a processing result displaying unit 102c, and an image correcting unit 102d.

The image acquiring unit 102a-1 is an image-scanning driver serving as an image acquiring unit that acquires the images of the documents scanned by the image-scanning unit 112-1. The image acquiring unit 102a-1 may request the image-scanning unit 112-1 to scan images when documents are set on the image-scanning unit 112-1, for example. The image acquiring unit 102a-1 may store the unprocessed images, which are the images of the documents scanned by the image-scanning unit 112-1, into the unprocessed image database 106a. The image acquiring unit 102a-1 may produce the thumbnails of the unprocessed images and store the thumbnails into the unprocessed image database 106a. The image acquiring unit 102a-1 may produce an ID of an unprocessed image and store the ID into the unprocessed image database 106a. The image acquiring unit 102a-1 may transmit a notification that the image of the document scanned by the image-scanning unit 112-1 is acquired to the image processing unit 102b-1. That is, the image acquiring unit 102a-1 may notify the image processing unit 102b-1 of the acquisition of the image of the document scanned by the image-scanning unit 112-1. The image acquiring unit 102a-1 may request the image-scanning unit 112-1 to scan the images until no documents to be scanned remain and continue to notify the image processing unit 102b-1 of the acquisition of a new image without waiting for the image to be processed by the image processing unit 102b-1.

The image acquiring unit 102a-2 is an image-scanning driver serving as an image acquiring unit that acquires the images of the documents scanned by the image-scanning unit 112-2. The image acquiring unit 102a-2 may request the image-scanning unit 112-2 to scan images when documents are set on the image-scanning unit 112-2, for example. The image acquiring unit 102a-2 may store the unprocessed images, which are the images of the documents scanned by the image-scanning unit 112-2, into the unprocessed image database 106a. The image acquiring unit 102a-2 may produce the thumbnails of the unprocessed images and store the thumbnails into the unprocessed image database 106a. The image acquiring unit 102a-2 may produce an ID of an unprocessed image and store the ID into the unprocessed image database 106a. The image acquiring unit 102a-2 may transmit a notification that the image of the document scanned by the image-scanning unit 112-2 is acquired to the image processing unit 102b-2. That is, the image acquiring unit 102a-2 may notify the image processing unit 102b-2 of the acquisition of the image of the document scanned by the image-scanning unit 112-2. The image acquiring unit 102a-2 may request the image-scanning unit 112-2 to scan the images until no documents to be scanned remain and continue to notify the image processing unit 102b-2 of the acquisition of a new image without waiting for the image to be processed by the image processing unit 102b-2. The image acquiring unit 102a-1 and the image acquiring unit 102a-2 may request, without in synchronization with each other, the image-scanning unit 112-1 or the image-scanning unit 112-2 to scan images.

The image processing unit 102b-1 is an image processing unit that executes image processing on the document scanned by the image-scanning unit 112-1. The image processing unit 102b-1 may parallel execute image processing on the image of the document scanned by the image-scanning unit 112-1 and continuous scanning of the documents executed by the image-scanning unit 112-1. The image processing unit 102b-1 may receive a notification of the acquisition of the image from the image acquiring unit 102a-1. The image processing unit 102b-1 may acquire the image based on the notification transmitted by the image acquiring unit 102a-1 from the unprocessed image database 106a and execute image processing on the acquired image. The image processing unit 102b-1 may receive the notification from the image acquiring unit 102a-1 and execute image processing until no notification is received from the image acquiring unit 102a-1. When the image processing is complete, the image processing unit 102b-1 may store the processed image (image processing result) into the processed image database 106b and notify the thumbnail and a determination result (image processing result) of the processed image to the processing result displaying unit 102c. The image processing unit 102b-1 determines a clipping position based on the image of the document scanned by the image-scanning unit 112-1 and clips a part from the image in automatic document size detection processing, for example. If it is determined that the document size is out of determination, the image processing unit 102b-1 may transmit an error notification and the unprocessed image to the processing result displaying unit 102c. When determining that the document size determination may be incorrect in the automatic document size detection processing, the image processing unit 102b-1 transmits the processed image and a clipping determination result to the processing result displaying unit 102c.

The image processing unit 102b-2 is an image processing unit that executes image processing on the document scanned by the image-scanning unit 112-2. The image processing unit 102b-2 may parallel execute image processing on the image of the document scanned by the image-scanning unit 112-2 and continuous scanning of the documents executed by the image-scanning unit 112-2. The image processing unit 102b-2 may receive a notification of the acquisition of the image from the image acquiring unit 102a-2. The image processing unit 102b-2 may acquire the image based on the notification transmitted by the image acquiring unit 102a-2 from the unprocessed image database 106a and execute image processing on the acquired image. The image processing unit 102b-2 may receive the notification from the image acquiring unit 102a-2 and execute image processing until no notification is received from the image acquiring unit 102a-2. When the image processing is complete, the image processing unit 102b-2 may store the processed image (image processing result) into the processed image database 106b and notify the thumbnail and a determination result (image processing result) of the processed image to the processing result displaying unit 102c. The image processing unit 102b-2 determines a clipping position based on the image of the document scanned by the image-scanning unit 112-2 and clips a part from the image in automatic document size detection processing, for example. If it is determined that the document size is out of determination, the image processing unit 102b-2 may transmit an error notification and the unprocessed image to the processing result displaying unit 102c. When determining that the document size determination may be incorrect in the automatic document size detection processing, the image processing unit 102b-2 transmits the processed image and a clipping determination result to the processing result displaying unit 102c.

The description of configuration of the processing result displaying unit 102c and the image correcting unit 102d shown in FIG. 3 is omitted because the configuration is the same as configuration of the processing result displaying unit 102c and the image correcting unit 102d shown in FIG. 2.

Processing Performed by the Image Processing Apparatus 100

An example of processing performed by the image processing apparatus 100 having the above configuration according to the embodiment is explained in detail below with reference to FIGS. 4 to 7.

Image Scanning Processing

Figure 4:
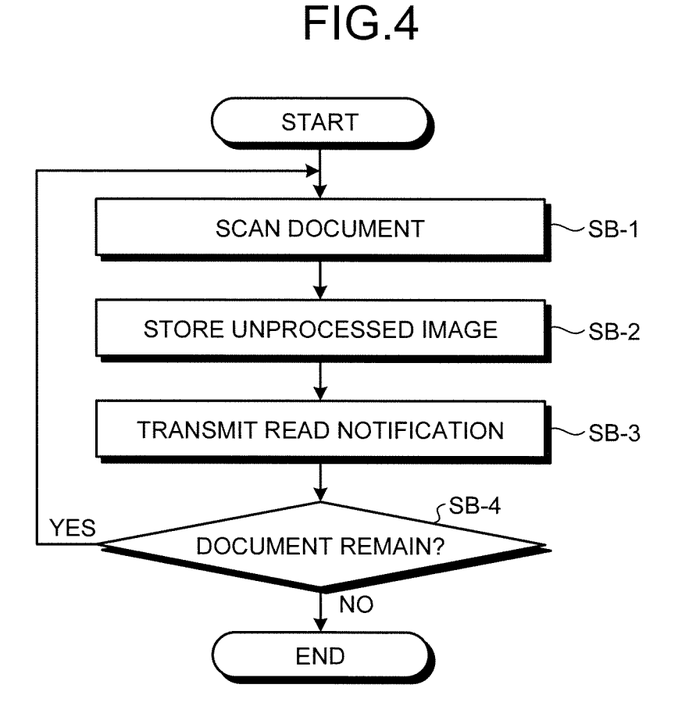
FIG. 4 is a flowchart of an example of processing executed by the image processing apparatus according to the embodiment.

First, an example of image scanning processing according to the embodiment is explained in detail below with reference to FIG. 4. FIG. 4 is a flowchart of an example of processing executed by the image processing apparatus 100 according to the embodiment.

As shown in FIG. 4, when a user sets a plurality of documents on the image-scanning unit 112, the image acquiring unit 102a requests the image-scanning unit 112 to continuously scan high resolution color images and acquires the unprocessed images that are images of the documents scanned by the image-scanning unit 112 (step SB-1). The image acquiring unit 102a may request the image-scanning unit 112 to scan the images until no documents to be scanned remain without waiting for the images of the documents to be processed by the image processing unit 102b. With such processing, the image acquiring unit 102a can allow the image-scanning unit 112 to continue to scan the documents independently of the processing executed by the image processing unit 102b.

The image acquiring unit 102a produces any one or both of the thumbnail and the ID of the unprocessed image acquired at step SB-1 and store any one or more of the unprocessed image, the thumbnail, and the ID into the unprocessed image database 106a (step SB-2). For example, when a user transfers an unprocessed image or a processed image to an application such as an e-mail application and the unprocessed image or the processed image is corrected by the application, the tag information may disappear. In this situation, with the addition of the ID on the image, the unprocessed image to be processed again can be retrieved very quickly by determining a similarity between the unprocessed image to be processed again and the stored thumbnail of the unprocessed image.

The image acquiring unit 102a transmits a scan notification that the unprocessed image acquired at step SB-1, is acquired to the image processing unit 102b (step SB-3). The image acquiring unit 102a may continue to transmit the scan notification to the image processing unit 102b until no documents to be scanned remain in the image-scanning unit 112.

The control unit 102 determines whether the document to be scanned remains in the image-scanning unit 112 (step SB-4).

When determining that the document to be scanned remains in the image-scanning unit 112 (YES at step SB-4), the control unit 102 proceeds to step SB-1. When determining that no documents to be scanned remain in the image-scanning unit 112 (NO at step SB-4), the control unit 102 ends the processing.

Image Processing

Figure 5:
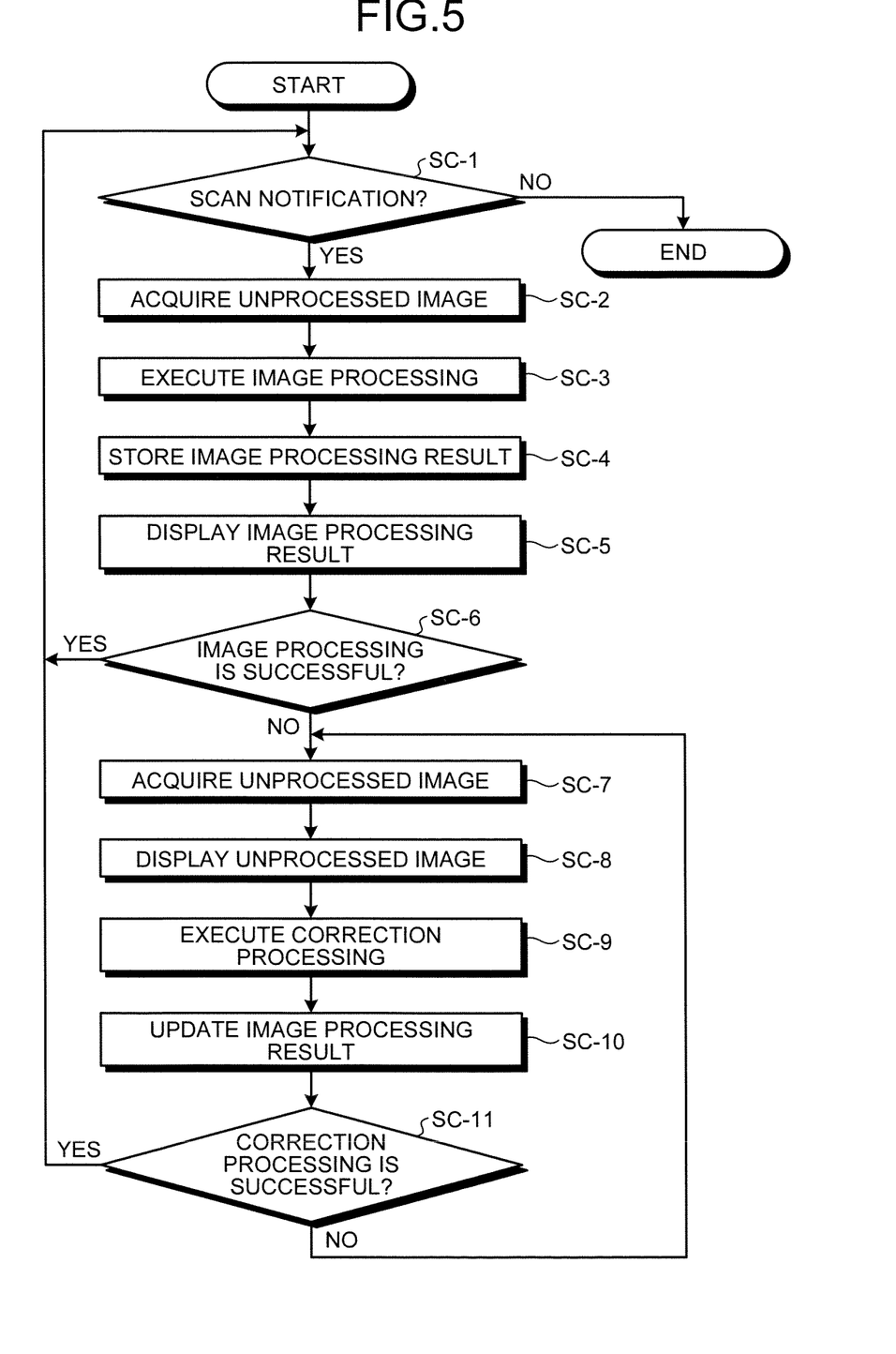
FIG. 5 is a flowchart of an example of processing executed by the image processing apparatus according to the embodiment.

An example of the image processing of the embodiment is explained below with reference to FIGS. 5 to 7. FIG. 5 is a flowchart of an example of the processing executed by the image processing apparatus 100 according to the embodiment.

As shown in FIG. 5, the image processing unit 102b determines whether a scan notification is received from the image acquiring unit 102a (step SC-1). The image processing unit 102b may be activated by predetermined operational timing (e.g., a predetermined period or detection of an operation signal of the image-scanning unit 112) when in a standby state, for example, and then determine whether a scan notification is received from the image acquiring unit 102a.

When determining that the scan notification is not received at step SC-1 (NO at step SC-1), the image processing unit 102b ends the processing. The image processing unit 102b may proceed to the processing in a standby state.

On the other hand, when determining that the scan notification is received at step SC-1 (YES at step SC-1), the image processing unit 102b acquires the unprocessed image from the unprocessed image database 106a based on the scan notification (step SC-2).

The image processing unit 102b executes image processing on the unprocessed image acquired from the unprocessed image database 106a, acquires an image processing result, and transmits (notifies) the image processing result to the processing result displaying unit 102c (step SC-3). The image processing result may include the processed image and the determination result of the processed image when the image processing is complete (successful). When it is determined that the completion of the image processing is out of determination or the image processing is failed, the image processing result may include an error notification and the unprocessed image. When it is determined that the determination on the completion of the image processing may be incorrect, the image processing result may include the processed image and a notification that the processed image may be incorrect. For example, when it is determined that a document size is out of determination in the automatic document size detection processing executed as the image processing, the image processing result may include the error notification and the unprocessed image. When it is determined that the determination of the document size may be incorrect in the automatic document size detection processing executed as the image processing, the processing result may include the clipped result (the processed image) and the clipping determination result (notification that the processed image may be incorrect). When the image-scanning unit 112 executes the continuous scanning-processing on the documents shown in FIG. 4, the image processing unit 102*b* may parallel execute image processing on the document scanned by the image-scanning unit 112, for example.

When receiving the image processing result from the image processing unit 102*b*, the processing result displaying unit 102*c* produces the thumbnail and the ID of the image included in the image processing result and stores the image, the thumbnail, and the ID into the processed image database 106*b* (step SC-4). When images are requested to be scanned as a PDF file, for example, as a scanning setting, the processing result displaying unit 102*c* may store a plurality of images into the processed image database 106*b* as a single PDF file.

The processing result displaying unit 102*c* displays on the display unit 114 the image processing result received from the image processing unit 102*b* (step SC-5). The processing result displaying unit 102*c* may display on the display unit 114 any one or both of the unprocessed images and the processed images included in the image processing result received from the image processing unit 102*b* as a list. The processing result displaying unit 102*c* may display on the display unit 114 the thumbnails of the images included in the image processing result received from the image processing unit 102*b* as a list. This processing can save memory capacity, resulting in time taken to display images being reduced. The processing result displaying unit 102*c* may be capable of selecting, based on any one or both of the ID of the unprocessed image and the ID of the processed image, the image corresponding to any one or both of the ID of the unprocessed image and the ID of the processed image. The processing result displaying unit 102*c* may be capable of selecting an image based on a similarity between the unprocessed image and the processed image. For example, when the document size determination is successful in the automatic document size detection processing executed by the image processing unit 102*b*, the processing result displaying unit 102*c* may display the thumbnail and the determination result of the processed image transmitted from the image processing unit 102*b* on the display unit 114. When a user does not satisfy the result, the processing result displaying unit 102*c* may transmit the unprocessed image to the image correcting unit 102*d* based on a correction request made by the user through the input unit 116.

An example of an image processing result display of the embodiment is explained with reference to FIG. 6. FIG. 6 is a diagram of an example of a display screen according to the embodiment.

Figure 6:
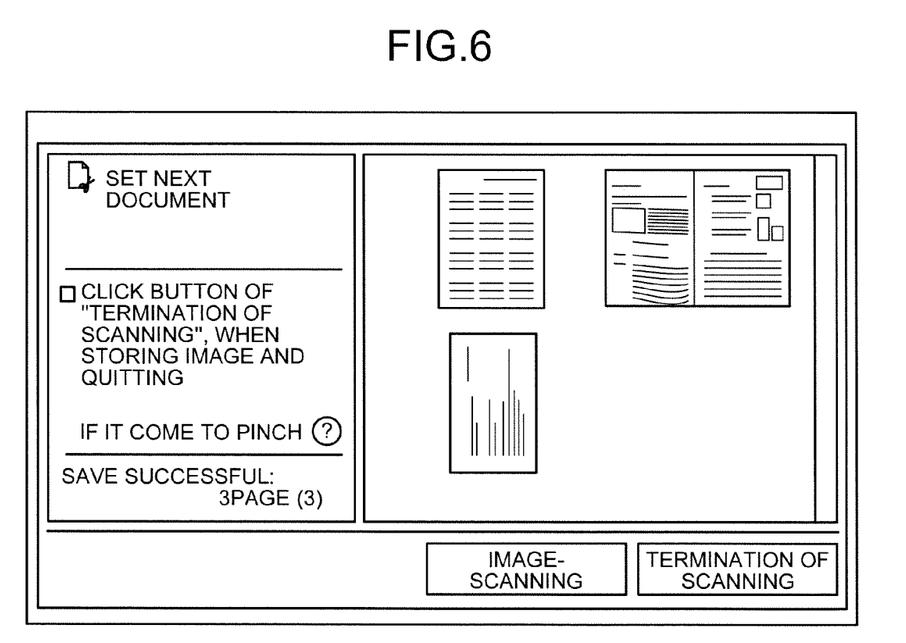
FIG. 6 is a diagram of an example of a display screen according to the embodiment.

As shown in FIG. 6, the processing result displaying unit 102*c* displays on the display unit 114 the thumbnails included in three image processing results sequentially received from the image processing unit 102*b* as a list. When a correction request is input (e.g., the thumbnail is double-clicked) by a user through the input unit 116 because the user does not satisfy the image processing result such as the image processing result image illustrated at the upper right in FIG. 6, in which the lower end of the image is missing, the processing result displaying unit 102*c* may proceed to the image correction processing (e.g., to display a screen for image correction executed by the image processing unit 102*b*).

Referring back to FIG. 5, the image processing unit 102*b* determines whether the image processing at step SC-3 is successful (complete) (step SC-6).

When determining that the image processing is complete at step SC-6 (YES at step SC-6), the image processing unit 102*b* proceeds to step SC-1.

On the other hand, when the image processing unit 102*b* determines that the image processing is incomplete at step SC-6 (out of determination, a failure, or determination may be incorrect) (NO at step SC-6), the image correcting unit 102*d* acquires the unprocessed image, on which the image processing unit 102*b* determines that the image processing is incomplete, from the unprocessed image database 106*a* (step SC-7). The image correcting unit 102*d*, based on any one or both of the ID of the unprocessed image and the ID of the processed image, may select and acquire the unprocessed image corresponding to any one or both of the ID of the unprocessed image and the ID of the processed image from the unprocessed image database 106*a*. The image correcting unit 102*d* may select and acquire an unprocessed image from the unprocessed image database 106*a* based on a similarity between the unprocessed image and the processed image.

The image correcting unit 102*d* displays on the display unit 114 the unprocessed image acquired at step SC-7 (step SC-8). The image correcting unit 102*d* may display on the display unit 114 the unprocessed images as a list.

The image correcting unit 102*d* corrects the unprocessed image based on the correction instruction input by the user through the input unit 116 (step SC-9). The image correcting unit 102*d* may correct the unprocessed image by executing image processing with changed parameters from those used in the image processing executed by the image processing unit 102*b*. When all of the images are far from user's expectation due to a wrong scanning setting done by the user, for example, the image correcting unit 102*d* may correct all of the unprocessed images at once based on a correction instruction done by the user through the input unit 116.

An example of the image correction processing of the embodiment is explained with reference to FIG. 7. FIG. 7 is a diagram of an example of a display screen according to the embodiment.

Figure 7:
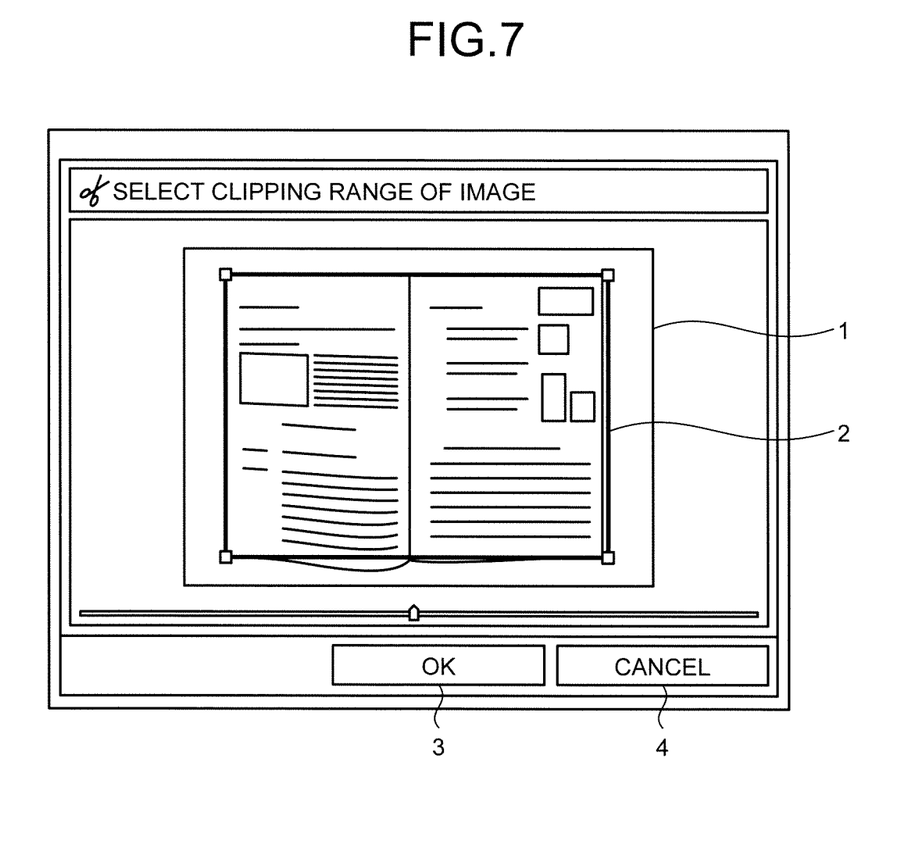
FIG. 7 is a diagram of an example of a display screen according to the embodiment.

As shown in FIG. 7, the image correcting unit 102*d* displays on the display unit 114 a white rectangle 1, a blue line 2, an OK button 3, and a cancelation button 4. The white rectangle 1 indicates the unprocessed image acquired from the unprocessed image database 106*a*, i.e., is a polyline indicating the clipping position detected as the document. The blue line 2 is a polyline indicating the clipping position for correction. The OK button 3 is a button widget that instructs the execution of the correction. The cancelation button 4 is a button widget that cancels the execution of the correction. When a user adjusts the clipping position by dragging the white rectangle 1 or the blue line 2 though the input unit 116 and selects the clipping position by pressing the OK button 3, the image correcting unit 102*d* corrects (image processing) the unprocessed image based on the clipping position. When the user double-clicks the thumbnail through the input unit 116 in the screen shown in FIG. 6, the image correcting unit 102*d* may display on the display unit 114 the display screen shown in FIG. 7.

Referring back to FIG. 5, when the image correcting unit 102*d* completes the correction processing at step SC-9, the processing result displaying unit 102*c* receives the unprocessed image after correction, produces the thumbnail of the unprocessed image after correction, and stores the unprocessed image after correction and the thumbnail into the processed image database 106*b* so as to update the image processing result (step SC-10). The processing result displaying unit 102c may display on the display unit 114 the unprocessed image after correction or the thumbnail of the unprocessed image after correction.

The control unit 102 determines whether the correction processing executed on the unprocessed image by the image correcting unit 102d at step SC-9 is successful (complete) (step SC-11).

When determining that the image processing at step SC-11 is complete (YES at step SC-6), the control unit 102 proceeds to step SC-1. When determining that the image processing at step SC-11 is incomplete (out of determination, a failure, or determination may be incorrect) (NO at step SC-11), the control unit 102 proceeds to step SC-7.

In the conventional technique, when an image needs to be corrected due to poor quality of a scanned image or an unexpected image, scanning is interrupted so as to correct the image and rescanning is executed or the image to be corrected needs to be retrieved after being scanned, and the scanned image needs to be corrected by an image correction tool as much as possible. If the image cannot be corrected by the image correction tool, the image needs to be scanned again, in the conventional technique. In this way, scanning is interrupted for image correction or the document needs to be corrected alone is scanned many times in the conventional technique. As a result, the image processing apparatus cannot fully exhibit the performance thereof even though it has excellent scanning performance. In the embodiment, image-scanning processing and image processing or image correction processing are parallel executed, so that the following problem of the conventional technique is solved. In the conventional technique, in which the image-scanning processing and the image processing or the image correction processing are sequentially executed, if the image processing performance is lowered due to increase in accuracy of the image processing, the lowering of the image processing performance adversely affects the image-scanning processing directly, resulting in lowering of the image-scanning performance.

Other Embodiment

The embodiment of the present invention is explained above. However, the present invention may be implemented in various different embodiments other than the embodiment described above within a technical scope described in claims.

For example, an example in which the image processing apparatus 100 performs the processing as a standalone apparatus is explained. However, the image processing apparatus 100 can be configured to perform processes in response to request from a client terminal (having a housing separate from the image processing apparatus 100) and return the process results to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the image processing apparatus 100 are merely conceptual and may not necessarily physically resemble the structures shown in the drawings.

For example, the process functions performed by each device of the image processing apparatus 100, especially the each process function performed by the control unit 102, can be entirely or partially realized by CPU and a computer program executed by the CPU or by a hardware using wired logic. The computer program, recorded on a non-transitory computer readable recording medium including programmed commands for causing a computer to execute the method of the present invention, can be mechanically read by the image processing apparatus 100 as the situation demands. In other words, the storage unit 106 such as read-only memory (ROM) or hard disk drive (HDD) stores the computer program that can work in coordination with an operating system (OS) to issue commands to the CPU and cause the CPU to perform various processes. The computer program is first loaded to the random access memory (RAM), and forms the control unit in collaboration with the CPU.

Alternatively, the computer program can be stored in any application program server connected to the image processing apparatus 100 via the network, and can be fully or partially loaded as the situation demands.

The computer program may be stored in a computer-readable recording medium, or may be structured as a program product. Here, the "recording medium" includes any "portable physical medium" such as a memory card, a USB (Universal Serial Bus) memory, an SD (Secure Digital) card, a flexible disk, an optical disk, a ROM, an EPROM (Erasable Programmable Read Only Memory), an EEPROM (Electronically Erasable and Programmable Read Only Memory), a CD-ROM (Compact Disk Read Only Memory), an MO (Magneto-Optical disk), a DVD (Digital Versatile Disk), and a Blu-ray Disc.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

Various databases (the unprocessed image database 106a and the processed image database 106b) stored in the storage unit 106 is a storage unit such as a memory device such as a RAM or a ROM, a fixed disk device such as a HDD, a flexible disk, and an optical disk, and stores therein various programs, tables, databases, and web page files used for providing various processing or web sites.

The image processing apparatus 100 may be structured as an information processing apparatus such as known personal computers or workstations, or may be structured by connecting any peripheral devices to the information processing apparatus. Furthermore, the image processing apparatus 100 may be realized by mounting software (including programs, data, or the like) for causing the information processing apparatus to implement the method according of the invention.

The distribution and integration of the device are not limited to those illustrated in the figures. The device as a whole or in parts can be functionally or physically distributed or integrated in an arbitrary unit according to various attachments or how the device is to be used. That is, any embodiments described above can be combined when implemented, or the embodiments can selectively be implemented.

According to the present invention, the accuracy of image processing can be improved without adversely affecting scanning performance.

According to the present invention, images before being processed acquired from the image-scanning unit are stored separately and the image stored separately are used in image processing and image correction. As a result, image-scanning, image processing, and correction processing can be managed independently. Accordingly, the invention can provide a function allowing a user to easily correct images while fully using the performance of the image-scanning unit.

According to the present invention, thumbnails having sizes smaller than those of the original images can be displayed, so that a user can see the picture of the whole of the documents scanned by the image-scanning unit. In addition, according to the invention, time taken to display images can be reduced by producing any one or both of the thumbnails of the unprocessed images and the thumbnails of the processed images.

According to the present invention, when a user is aware of the fact that setting is wrong or image determination is failed after transferring an image to an application such as an e-mail application, the unprocessed image can be retrieved based on the ID added on the image, whereby the image can be corrected again.

According to the present invention, the image to be corrected again can be retrieved instantly by determining a similarity between the unprocessed image to be corrected again and the stored thumbnail of the processed image. According to the invention, when the ID added on an image disappears during correction of the image with an application that can correct the image, for example, the image to be corrected can be instantly retrieved.

According to the present invention, a large number of images can be scanned in a short time. According to the invention, a plurality of image-scanning units can be used in combination, so that images can be efficiently scanned. Examples of the image-scanning units include a sheet feed scanner that can scan a single document or a plurality of documents, a flat bed scanner or an overhead scanner that can scan a book and the like, and a camera for taking pictures.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
   an image-scanner;
   an image processor;
   an unprocessed image storage that stores unprocessed images that are images of documents scanned by the image-scanner;
   a processed image storage configured to store processed images that are images after image processing executed by the image processor on the scanned documents;
   a display configured to display the processed images; and
   an image corrector configured to correct the unprocessed images, wherein:
   when the image-scanner continuously scans a plurality of documents, continuous scanning of the documents by the image-scanner and image processing of the scanned documents by the image processor are performed in parallel with each other;
   the unprocessed image storage adds on each of the unprocessed images unprocessed image identification information serving as unique identification information of each unprocessed image and stores the unprocessed images with the unprocessed image identification information;
   the processed image storage adds on each of the processed images processed image identification information serving as unique identification information of each processed image and stores the processed images with the processed image identification information; and
   at least one of the display and the image corrector is configured to select an image corresponding to any one or both of unprocessed image identification information and processed image identification information based on any one or both of the unprocessed image identification information and the processed image identification information.

2. The image processing apparatus according to claim 1, wherein the display or the image corrector displays any one or both of the unprocessed images and the processed images as a list.

3. The image processing apparatus according to claim 1, wherein at least one of the display and the image corrector is configured to select the image based on a similarity between an unprocessed image and an processed image.

4. The image processing apparatus according to claim 1, comprising more than one image-scanners.

5. An image processing method executed by an image processing apparatus including an image scanner and an image processor, the method executed by the image processing unit, comprising:
   executing image processing on scanned documents parallel with continuous document-scanning by the image-scanner when the image-scanner continuously scans a plurality of documents;
   storing unprocessed images that are images of the documents scanned by the image-scanner;
   storing processed images that are images after the image processing executed by the image processor on the scanned documents;
   displaying the processed images; and
   correcting the unprocessed images, wherein
   the unprocessed image storage step adds on each of the unprocessed images unprocessed image identification information serving as unique identification information of each unprocessed image and stores the unprocessed images with the unprocessed image identification information;
   the processed image storage step adds on each of the processed images processed image identification information serving as unique identification information of each processed image and stores the processed images with the processed image identification information; and
   at least one of the displaying step and the correcting step includes selecting an image corresponding to any one or both of unprocessed image identification information and processed image identification information based on any one or both of the unprocessed image identification information and the processed image identification information.

6. A non-transitory tangible computer readable mediums including programmed instructions for an image processing method executed by an image processing apparatus including an image-scanning unit and an image processing unit, wherein
   the instructions, when executed by the image processing unit, cause the image processing unit to execute the steps of:
   executing image processing on scanned documents parallel with continuous document-scanning by the image-scanning unit when the image-scanning unit continuously scans a plurality of documents;

storing unprocessed images that are images of the documents scanned by the image-scanner;

storing processed images that are images after the image processing executed by the image processor on the scanned documents;

displaying the processed images; and correcting the unprocessed images, wherein the unprocessed image storage step adds on each of the unprocessed images unprocessed image identification information serving as unique identification information of each unprocessed image and stores the unprocessed images with the unprocessed image identification information;

the processed image storage step adds on each of the processed images processed image identification information serving as unique identification information of each processed image and stores the processed images with the processed image identification information; and at least one of the displaying step and the correcting step includes selecting an image corresponding to any one or both of unprocessed image identification information and processed image identification information based on any one or both of the unprocessed image identification information and the processed image identification information.

* * * * *